United States Patent
Xu et al.

(10) Patent No.: US 10,394,664 B1
(45) Date of Patent: Aug. 27, 2019

(54) IN-MEMORY PARALLEL RECOVERY IN A DISTRIBUTED PROCESSING SYSTEM

(71) Applicant: EMC IP Holding Company LLC, Hopkinton, MA (US)

(72) Inventors: Kevin Xu, Warren, NJ (US); Junping Zhao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 126 days.

(21) Appl. No.: 15/668,890

(22) Filed: Aug. 4, 2017

(51) Int. Cl.
*G06F 11/14* (2006.01)
*G06F 11/20* (2006.01)
*G06F 3/06* (2006.01)

(52) U.S. Cl.
CPC ........ *G06F 11/1464* (2013.01); *G06F 3/0604* (2013.01); *G06F 3/067* (2013.01); *G06F 3/0631* (2013.01); *G06F 3/0656* (2013.01); *G06F 11/203* (2013.01); *G06F 2201/84* (2013.01)

(58) Field of Classification Search
CPC ............ G06F 11/1438; G06F 11/1448; G06F 11/1497; G06F 11/2025; G06F 11/2046; G06F 11/1458; G06F 3/067; G06F 3/0683
See application file for complete search history.

(56) References Cited

U.S. PATENT DOCUMENTS

| | | | |
|---|---|---|---|
| 7,689,863 B1* | 3/2010 | Korenevsky | G06F 11/1461 714/15 |
| 8,225,129 B2* | 7/2012 | Douglis | G06F 11/1482 714/2 |
| 8,688,850 B2* | 4/2014 | Branson | H04L 69/40 709/224 |
| 8,874,524 B1 | 10/2014 | Zhao et al. | |
| 9,116,759 B2* | 8/2015 | Douros | G06F 9/542 |

(Continued)

OTHER PUBLICATIONS hadoopsummit.org, "Hadoop Summit 2016," http://hadoopsummit.org/melbourne/agenda/, 2016, 11 pages, Mebourne, Australia.

(Continued)

*Primary Examiner* — Nadeem Iqbal
(74) *Attorney, Agent, or Firm* — Ryan, Mason & Lewis, LLP

(57) ABSTRACT

An apparatus in one embodiment comprises a distributed processing system including a plurality of processing nodes. The processing nodes implement respective ones of a plurality of operators for a processing a data stream in the distributed processing system. Responsive to a detected fault in a given one of the operators processing the data stream, other ones of the operators processing the data stream are partitioned into one or more upstream operators, one or more immediately downstream operators, and one or more further downstream operators, relative to the given faulted operator. The given faulted operator is recovered from a checkpoint of that operator. In parallel with recovering the given faulted operator, different sets of operations are performed for respective ones of the upstream operators, immediately downstream operators and further downstream operators. A given such set of operations may be performed utilizing window metadata maintained for respective buffers of the processing nodes.

21 Claims, 9 Drawing Sheets

(56) References Cited

U.S. PATENT DOCUMENTS 10,037,187 B2 * 7/2018 Akidau .................. H04L 47/00
2008/0307258 A1 * 12/2008 Challenger ......... G06F 11/1438
714/20

OTHER PUBLICATIONS

P. Carbone et al., "Lightweight Asynchronous Snapshots for Distributed Dataflows," arXiv preprint arXiv:1506,08603, Jun. 29, 2015, 8 pages.

S. Venkataraman et al., "Drizzle: Fast and Adaptable Stream Processing at Scale," Spark Summit, 2016, 16 pages.

* cited by examiner

US 10,394,664 B1

IN-MEMORY PARALLEL RECOVERY IN A DISTRIBUTED PROCESSING SYSTEM

FIELD

The field relates generally to information processing systems, and more particularly to fault recovery in distributed processing systems.

BACKGROUND

Information processing systems are often configured in a distributed manner. For example, clustered processing systems are illustratively implemented using multiple distributed processing nodes that are interconnected by one or more networks. A problem that can arise in these and other distributed processing systems is that recovery from failures or other faults in a given one of the processing nodes can be unduly time-consuming and disruptive. For example, when multiple nodes are processing a given data stream, a fault in a given one of the nodes can in some cases require all of the downstream nodes to be rolled back to the least recent checkpoint taken among all of the checkpoints of those nodes. Such an arrangement is wasteful of system resources and adversely impacts system performance.

SUMMARY

Illustrative embodiments provide techniques for in-memory parallel recovery from faults in a distributed processing system.

In one embodiment, an apparatus comprises a distributed processing system including a plurality of processing nodes. Each of the processing nodes comprises a processor coupled to a memory and is configured to communicate over one or more networks with other ones of the processing nodes. The processing nodes comprise respective buffers and respective components of a distributed checkpoint manager of the distributed processing system. The processing nodes also implement respective ones of a plurality of operators for a processing a data stream in the distributed processing system. Each of the operators is configured to interact with its corresponding one of the buffers and its corresponding one of the components of the distributed checkpoint manager on the corresponding one of the processing nodes.

Responsive to a detected fault in a given one of the operators processing the data stream, other ones of the operators processing the data stream are partitioned into one or more upstream operators, one or more immediately downstream operators, and one or more further downstream operators, relative to the given faulted operator. The given faulted operator is recovered from a checkpoint captured by its corresponding component of the distributed checkpoint manager. In parallel with recovering the given faulted operator, different sets of operations are performed for respective ones of the upstream operators, immediately downstream operators and further downstream operators.

For example, the set of operations performed for each upstream operator can include performing at least one pace-down action without recovery from a checkpoint captured by its corresponding component of the distributed checkpoint manager.

The set of operations performed for each immediately downstream operator can include determining if there is any partial data in its corresponding buffer. If there is no partial data in the buffer, then the set of operations for the immediately downstream operator includes continuing to process the data stream in-memory without recovery from a checkpoint captured by its corresponding component of the distributed checkpoint manager. If there is partial data in the buffer then the set of operations for the immediately downstream operator includes discarding the partial data and recovering from the checkpoint captured by its corresponding component of the distributed checkpoint manager.

The set of operations for each further downstream operator can include continuing to process the data stream in-memory without recovery from a checkpoint captured by its corresponding component of the distributed checkpoint manager.

A given such set of operations may be performed utilizing window metadata maintained for respective buffers of the processing nodes.

Alternative distinct sets of operations can be performed for respective ones of the upstream operators, immediately downstream operators and further downstream operators in other embodiments.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
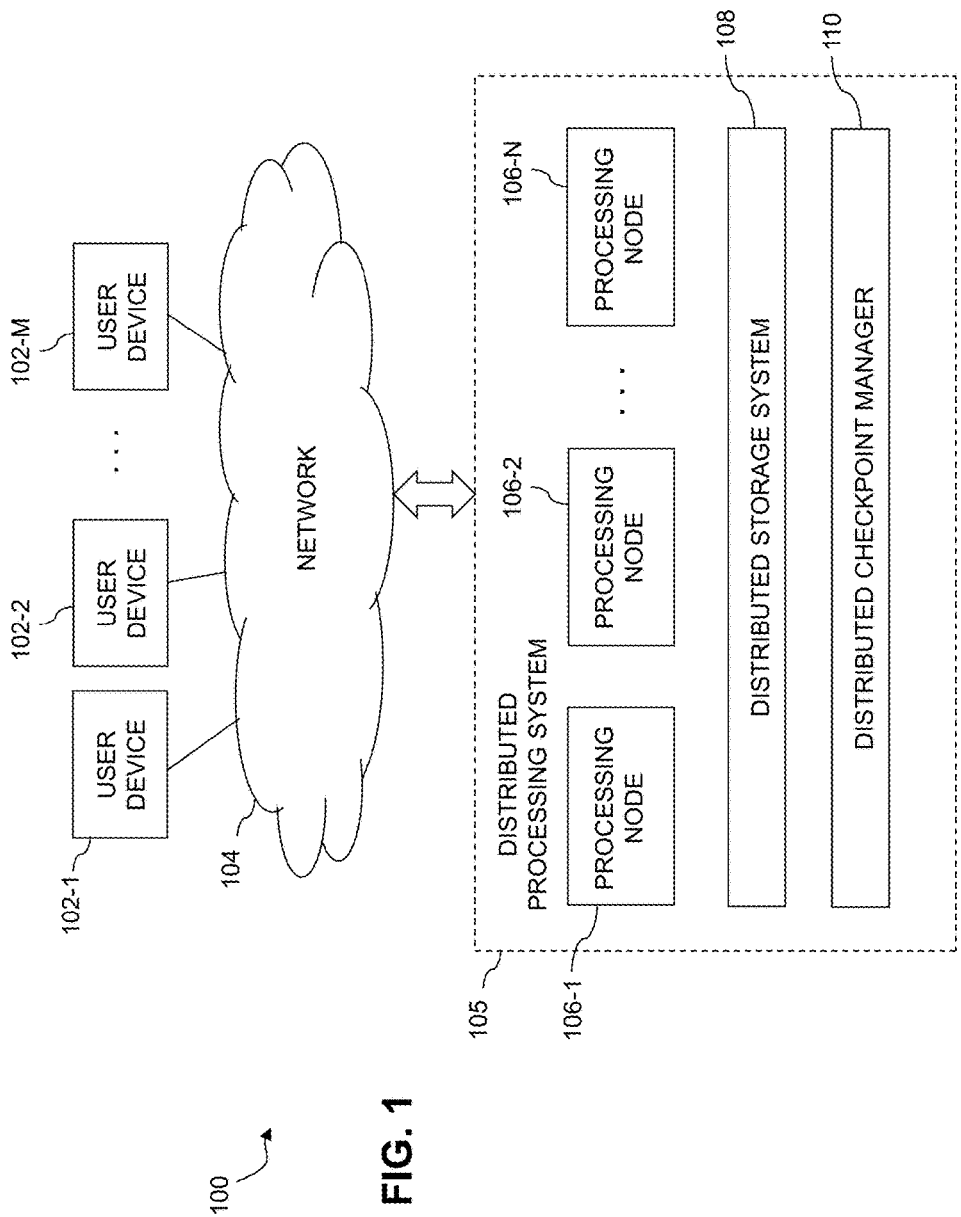
FIG. 1 is a block diagram of an information processing system comprising a distributed processing system configured with in-memory parallel recovery functionality in an illustrative embodiment.

FIG. 1 shows an information processing system 100 configured in accordance with an illustrative embodiment. The information processing system 100 comprises a plurality of user devices 102-1, 102-2, . . . 102-M. The user devices 102 communicate over a network 104 with a distributed processing system 105.

The distributed processing system 105 comprises a plurality of processing nodes 106-1, 106-2, . . . 106-N. Each of the processing nodes 106 is assumed to comprise a processor coupled to a memory and is configured to communicate over the network 104 with other ones of the processing nodes 106.

Each of the processing nodes 106 is further assumed to comprise a corresponding buffer which is not explicitly shown in FIG. 1. The buffers of the respective processing nodes 106 more particularly comprise respective in-memory buffers each having both an input buffer and an output buffer implemented within the memory of that processing node.

The distributed processing system 105 further comprises a distributed storage system 108 and a distributed checkpoint manager 110. One or more of these distributed elements can each comprise a plurality of components implemented on respective ones of the processing nodes 106. For example, the processing nodes 106 in the present embodiment are assumed to comprise respective components of the distributed checkpoint manager 110. The processing nodes 106 can similarly comprise respective components of the distributed storage system 108. Thus, although the distributed elements 108 and 110 are shown as separate from the processing nodes 106 in this figure, one or more of these distributed elements can be implemented at least in part within the processing nodes 106.

Numerous alternative arrangements are possible. For example, the distributed storage system 108 can be implemented at least in part utilizing a plurality of storage nodes that are separate from the processing nodes 106.

The distributed processing system 105 is illustratively configured to process one or more data streams within the system 100. The processing nodes 106 implement respective ones of a plurality of operators for a processing a given such data stream in the distributed processing system 105. Each of the operators is illustratively configured to interact with its corresponding one of the buffers and its corresponding one of the components of the distributed checkpoint manager 110 on the corresponding one of the processing nodes 106 in implementing in-memory parallel recovery functionality within the distributed processing system 105.

The distributed checkpoint manager 110 is configured via its components of the respective processing nodes 106 to capture checkpoints of the operators of those processing nodes 106. The distributed checkpoint manager 110 stores checkpoints for respective ones of the operators in the distributed storage system 108 of the distributed processing system 105. A given data stream being processed in the distributed processing system 105 may comprises one or more checkpoint control commands that are processed by the components of the distributed checkpoint manager of the respective processing nodes.

The processing nodes 106 illustratively comprise respective processing devices of one or more processing platforms. For example, the processing nodes 106 can comprise respective virtual machines (VMs) each having a processor and a memory. Numerous other configurations are possible, including other types of virtualization infrastructure such as Docker containers or other types of Linux containers (LXCs).

In some embodiments, at least a subset of the processing nodes 106 of the distributed processing system 105 collectively comprise one or more Apache Hadoop YARN ("Yet Another Resource Negotiator") clusters. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein. Numerous alternative types of distributed data processing clusters may be used in place of or in addition to Apache Hadoop YARN clusters.

The distributed processing system 105 in some embodiments leverages one or more frameworks supported by Hadoop YARN, such as MapReduce, Spark, Hive, MPI and numerous others, to support distributed computations.

In some arrangements of this type, the distributed processing system 105 is configured to process data streams originating from Internet of Things (IoT) devices or other similar data sources.

Illustrative embodiments process data from real-time streaming systems that can be represented as a directed acyclic graph (DAG) of multiple operators each associated with a corresponding processing node. The operators can run specific processing logic using Java threads or other software constructs. These and other embodiments can implement functionality such as machine learning and incremental analytics.

The processing nodes 106 can additionally or alternatively be part of cloud infrastructure such as an Amazon Web Services (AWS) system. Other examples of cloud-based systems that can be used to provide processing nodes 106 and possibly other portions of system 100 include Google Cloud Platform (GCP) and Microsoft Azure.

The distributed processing system 105 in some embodiments provides compute services such as execution of one or more distributed stream processing applications on behalf of each of one or more users associated with respective ones of the user devices 102.

The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used. Also, illustrative embodiments disclosed herein can be implemented outside of the cloud infrastructure context, as in the case of a stand-alone enterprise-based distributed computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The distributed storage system 108 in some embodiments comprises a Hadoop Distributed File System (HDFS), although it is to be appreciated that a wide variety of other types of storage systems can be used.

A given such storage system can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system of distributed processing system 105 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

As indicated previously, the distributed processing system 105 is configured to implement in-memory parallel recovery for operators of respective processing nodes that are processing a given data stream within the system 100. Such in-memory parallel recovery is illustratively implemented by the distributed checkpoint manager 110 for operators on one or more of the processing nodes 106. The operators collectively process a data stream in the distributed processing system 105. As noted above, the operators in some embodiments are interconnected in the form of a DAG.

Responsive to a detected failure or other fault in a given one of the operators processing the data stream, other ones of the operators processing the data stream are partitioned into one or more upstream operators, one or more immediately downstream operators, and one or more further downstream operators, relative to the given faulted operator.

The given faulted operator is recovered from a checkpoint captured by its corresponding component of the distributed checkpoint manager 110.

In parallel with recovering the given faulted operator, different sets of operations are performed for respective ones of the upstream operators, immediately downstream operators and further downstream operators. The term "parallel" as used herein is intended to be broadly construed, so as to encompass by way of example sets of operations that are performed at least partly in parallel.

Examples of in-memory parallel recovery processes will be described in greater detail below with reference to the illustrative embodiments of FIGS. 2 through 8.

Figure 2:
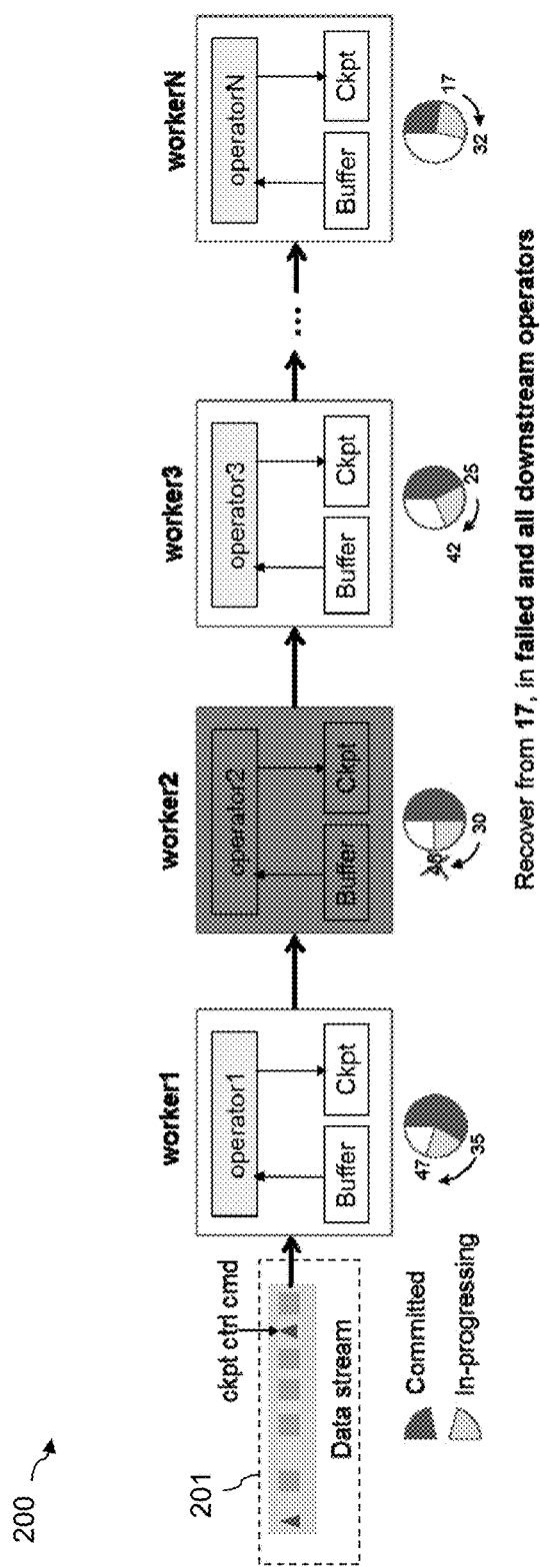
FIG. 2 shows an example of recovery from a least recent checkpoint, illustrating disadvantages associated with such an approach.

Referring initially to FIG. 2, an example of recovery from a least recent checkpoint is shown, illustrating disadvantages associated with such an approach. The least recent checkpoint is also referred to herein as a "common base checkpoint."

As noted above, when multiple nodes are processing a given data stream, a fault in a given one of the nodes can in some cases require that faulted node and all of its downstream nodes to be rolled back to the least recent checkpoint taken among all of the checkpoints of those faulted and downstream nodes. Such an arrangement is wasteful of system resources and adversely impacts system performance.

This situation is illustrated in a set of processing nodes 200 configured to process an incoming data stream 201 in one embodiment.

In this embodiment, the processing nodes 200 are more particularly implemented as worker nodes denoted worker1, worker2, worker3, . . . workerN. The worker nodes include respective operators denoted as operator1, operator2, operator3, . . . operatorN. Each of the worker nodes further includes an in-memory buffer and a checkpoint component that is assumed to be part of a distributed checkpoint manager 110.

Associated with each of the worker nodes in the FIG. 2 example is a small chart illustrating committed and in-progress data processing within that worker node. It can be seen that operatorN of workerN has the least recent checkpoint, corresponding to time 17 in its corresponding chart. The other operators operator1, operator2 and operator3 of respective worker nodes worker1, worker2 and worker3 have respective checkpoints at times 35, 30 and 25 as shown. The checkpoint of operatorN of workerN corresponding to time 17 is therefore the least recent checkpoint.

Assuming a failure or other fault in operator2 of worker2, which has a checkpoint at time 30 in processing data stream 201, that worker node and all of the other downstream worker nodes must roll back to the least recent checkpoint of operatorN at time 17. Thus, failed operator2 in worker2 and all downstream operators in the set of processing nodes 200 recover from time 17. The FIG. 2 arrangement is therefore an example of an arrangement in which the recovery process brings all relevant operators back to a common base checkpoint and then starts replaying those operators from that common base checkpoint.

It can be seen from the figure that there is a substantial lag between the common base checkpoint at time 17 and the more recent checkpoints of other ones of the operators, including the checkpoint of operator3 at time 25 and the checkpoint of failed operator2 at time 30. Also, failed operator2 had committed state at time 30 but was processing data ("in-progressing") at time 45 when the failure occurred. Similarly, downstream operators operator3 and operatorN were in-progress with data processing at times 42 and 32, respectively.

The recovery process in this example simply determines the common base checkpoint, and then the failed operator and all downstream operators reload state from that checkpoint. As a result, operator3 loses in-memory data from time 17 to time 42, and operatorN loses in-memory data from time 17 to 32. The upstream operator operator1 must resend all data starting from the checkpoint at time 17.

The disadvantages of such an arrangement are overcome in illustrative embodiments through the use of in-memory parallel checkpointing as disclosed herein.

The distributed checkpoint manager 110 in the FIG. 1 embodiment responds to a detected failure of other fault in a given one of the operators processing the data stream by partitioning other ones of the operators processing the data stream into one or more upstream operators, one or more immediately downstream operators, and one or more further downstream operators, relative to the given faulted operator.

The given faulted operator is recovered from a checkpoint captured by its corresponding component of the distributed checkpoint manager 110, and in parallel with recovering the given faulted operator, different sets of operations are performed for respective ones of the upstream operators, immediately downstream operators and further downstream operators.

For example, the set of operations performed for each upstream operator can include performing at least one pace-down action without recovery from a checkpoint captured by its corresponding component of the distributed checkpoint manager. The pace-down action for a given one of the upstream operators illustratively comprises increasing a size of its corresponding in-memory buffer.

The set of operations performed for each immediately downstream operator can include determining if there is any partial data in its corresponding buffer. If there is no partial data in the buffer, then the set of operations for the immediately downstream operator includes continuing to process the data stream in-memory without recovery from a checkpoint captured by its corresponding component of the distributed checkpoint manager. If there is partial data in the buffer then the set of operations for the immediately downstream operator includes discarding the partial data and recovering from the checkpoint captured by its corresponding component of the distributed checkpoint manager.

The set of operations for each further downstream operator can include continuing to process the data stream in-memory without recovery from a checkpoint captured by its corresponding component of the distributed checkpoint manager.

A given such set of operations may be performed utilizing window metadata maintained for respective buffers of the processing nodes.

Alternative distinct sets of operations can be performed for respective ones of the upstream operators, immediately downstream operators and further downstream operators in other embodiments.

The distributed checkpoint manager 110 is configured via its components of the respective processing nodes 106 to maintain window metadata for respective ones of the buffers of those processing nodes.

For example, the window metadata maintained for a given one of the buffers of a corresponding one of the processing nodes 106 comprises a receive window ("recvWindow") indicating new data most recently received in the buffer, a current window ("curWindow") indicating data currently being processed by the operator of the corresponding processing node, and a checkpoint window ("ckptWindow") indicating a last successful data checkpoint for that operator. Each of the receive window, the current window and the checkpoint window has a corresponding unique identifier. Also, the unique identifiers of the receive window, the current window and the checkpoint window increase over time as the data stream is processed by the operator.

Figure 3:
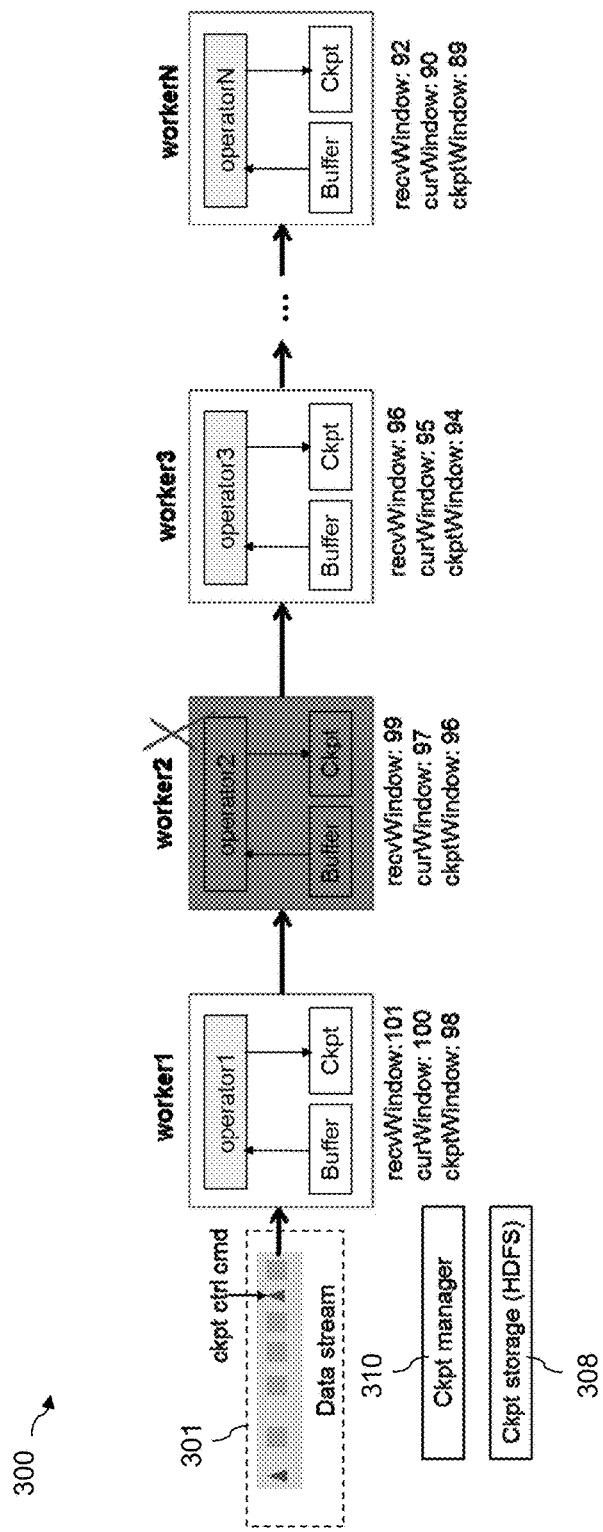
FIG. 3 shows an example of window metadata maintained for buffers of respective processing nodes in an illustrative embodiment.

Referring now to FIG. 3, a set of processing nodes 300 configured for in-memory parallel recovery is shown. The processing nodes 300 more particularly include worker nodes denoted worker1, worker2, worker3, . . . worker having respective operators denoted as operator1, operator2, operator3, . . . operatorN, collectively configured to process a data stream 301. Each of the worker nodes further includes an in-memory buffer and a checkpoint component that is assumed to be part of an instance 310 of distributed checkpoint manager 110. The distributed storage system 108 in this embodiment comprises checkpoint storage 308 implemented using HDFS.

The checkpoint components of the respective processing nodes 300 in this embodiment maintain window metadata for respective ones of the buffers of those processing nodes. The window metadata illustratively includes integer values for each of recvWindow, curWindow and ckptWindow for each of the processing nodes 300, as shown below each of the processing nodes in the figure. The instance 310 of distributed checkpoint manager 110 operates across all of the processing nodes 300. It tracks checkpoint commit status for each of the operators of those processing nodes. The ckptWindow value denotes the last successful checkpoint for the corresponding operator.

The window metadata maintained for a given one of the buffers of a corresponding one of the processing nodes 300 is more particularly maintained for an in-memory input buffer of the given buffer. The buffer is illustratively a first-in first-out (FIFO) staging buffer having a configurable size. The buffer can be used for storing data until a checkpoint is committed to persistent storage. It can also be used for pace control. For example, if downstream operators are running slowly then data can be stored in the buffer a bit longer in order to eliminate the pressure on the downstream operators.

The term "in-memory" as used herein is intended to be broadly construed so as to encompass processing within a memory such as the memory providing the buffer associated with a given one of the processing nodes 300. Such a memory in some embodiments is distinct from persistent storage utilized to store checkpoints in distributed storage system 108.

Figure 4:
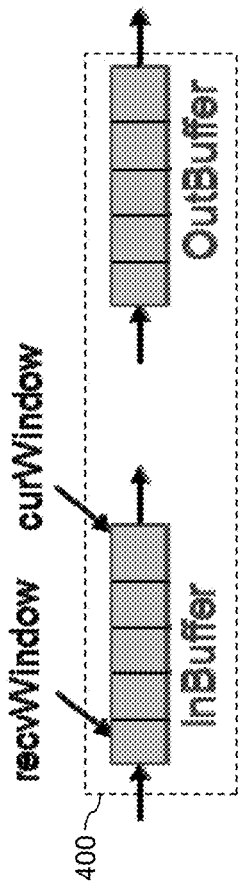
FIG. 4 shows an example of input buffer and output buffer components of an in-memory buffer of a given processing node in an illustrative embodiment.

FIG. 4 shows an example configuration of input buffer ("InBuffer") and output buffer ("OutBuffer") components of an in-memory buffer 400 of a given one of the processing nodes 300. The figure illustrates that recvWindow and curWindow point to respective different portions of the input buffer in this example.

The window metadata may be processed using their respective unique identifiers, illustratively denoted recvWindow.ID, curWindow.ID and ckptWindow.ID. The window metadata generally conform to a number of rules, including the following:

recvWindow.ID>curWindow.ID>ckptWindow.ID
upstream.curWindow.ID>downstream.recvWindow.ID
 (and >downstream.curWindow.ID)

The latter rule above indicates that an upstream operator need only send missing data that is not available in the downstream operators. Typically, the following additional rule holds true among the operators:

upstream.curWindow.ID>downstream.ckptWindow.ID

This is because checkpoint overhead is generally higher than the overhead associated with transferring a single time unit of data.

Illustrative embodiments utilize the window metadata to compare the current data processing and checkpoint status of each of the operators. For example, the window metadata recvWindow.ID and curWindow.ID for the immediately downstream operator can be compared with the ckptWindow.ID of the faulted operator to determine if there is partial data in the buffer of the immediately downstream operator, such that the partial data is discarded and the immediately downstream operator recovered from its last successful checkpoint, or if the immediately downstream operator can continue to operate using in-memory data without recovery from any checkpoint.

As indicated previously, the in-memory parallel recovery in illustrative embodiments involves partitioning operators into different groups relative to a given faulted operator and applying different sets of operations to the operators of the respective different groups.

Figure 5:
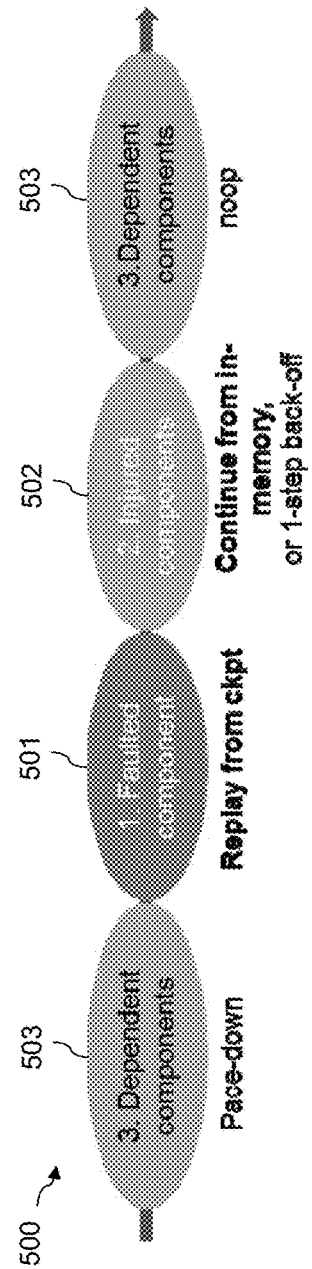
FIG. 5 illustrates partitioning of operators into upstream operators, immediately downstream operators and further downstream operators relative to a given faulted operator in one embodiment.

An example of such a partitioning 500 of operators into upstream operators, immediately downstream operators and further downstream operators relative to a given faulted operator in one embodiment is shown in FIG. 5. The operators in this particular example are also referred to as respective components.

The partitioning 500 in this example results in a faulted component 501, one or more immediately downstream components 502 which are also referred to herein as "injured components," and additional dependent components 503 that include at least one downstream dependent component and at least one upstream dependent component.

These different partitioned groups are recovered in different ways in accordance with an in-memory parallel recovery process. More particularly, the faulted component 501 is recovered by replay from its last successful checkpoint ("ckpt"). However, the other groups are generally not recovered from checkpoints. Instead, the injured components 502 will typically continue their in-memory processing of the data stream, and in some cases where window metadata indicates the presence of partial data in their respective buffers will discard the partial data and recover from a checkpoint via a 1-step back-off. The upstream dependent components 503 will implement one or more pace-down actions, while the downstream dependent components 503 do not take any recovery action ("no operation" or "noop").

The "discarding" of partial data herein can be implemented, for example, by deleting the data, allowing it to be overwritten, or otherwise making the data inaccessible.

Additional examples of in-memory parallel recovery processes based on partitioning of operators relative to a given faulted operator will now be described with reference to the flow diagrams of FIGS. 6 and 7.

Figure 6:
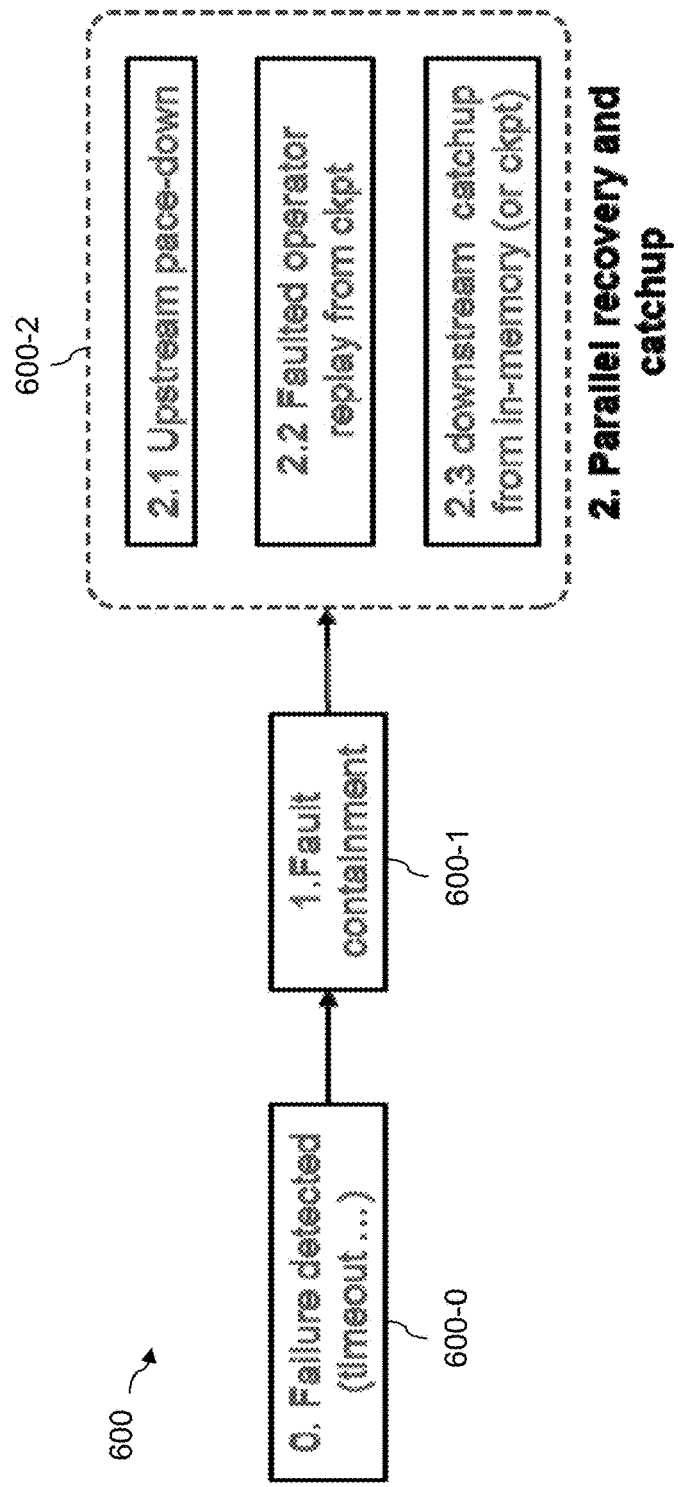
FIG. 6 is a flow diagram of an example process for in-memory parallel recovery in an illustrative embodiment.

Referring initially to FIG. 6, an in-memory parallel recovery process 600 comprises a plurality of phases 600-0, 600-1 and 600-2, also denoted as Phase 0, Phase 1 and Phase 2, respectively. Phase 2 is further divided into sub-phases 2.1, 2.2 and 2.3. It is to be appreciated that this particular separation into phase is by way of example only, and that other arrangements of phases and sub-phased can be used in other embodiments.

Phase 0 is a failure detection phase. A given failure or other fault associated with an operator of a processing node can be detected through absence of a normal "heartbeat" indicator for a predetermined timeout period. In such an arrangement, any failed operator can be detected within a given maximum time period. Detection of the failure triggers entry into the next phase of the process.

Phase 1 is a fault containment phase. In this phase, the distributed processing system 105 confirms the failure by performing one or more additional checks. It also identifies the scope of the impact of the failure and performs one or more containment actions, such as "fencing off" the failed component or reclaiming associated resources. Examples of such fencing off actions include marking the operator as failed so that other operators do not try to connect or reconnect to it, or obtaining replacement resources. The failed operator is typically restarted and recovered from its last successful checkpoint as described below and this in some cases may involve use of replacement resources. Accordingly, replacement resources such as a new VM or container in a different server or equipment rack may be requested so as to permit later redeployment and restarting of the failed operator.

Phase 2 is a parallel recovery and catch-up phase. As described previously, the operators are classified relative to the given faulted operator based on whether the operator is an upstream operator, an immediately downstream operator or a further downstream operator. Phase 2.1 performs one or more pace-down actions for the one or more upstream operators. For example, the pace-down actions may involve enlarging the buffers of the respective upstream operators so that more data can be buffered before sending downstream to the faulted operator. Phase 2.2 replays the given faulted operator from a checkpoint. Phase 2.3 typically performs catch-up in the downstream operators using in-memory data and in the case of an immediately downstream operator may require discarding of partial data and recovery from a checkpoint in accordance with a 1-step back-off. In one or more further downstream operators, scale-in actions may be applied in order to reclaim resources.

The operator topology utilized to partition the operators in accordance with the FIG. 6 process can be obtained from an application manager in conjunction with user deployment of the corresponding processing job in the distributed processing system 105.

In the FIG. 6 process, different sets of actions are enforced in parallel for respective different categories of operators until catch-up is complete. Unlike the disadvantageous FIG. 2 arrangement, this process does not utilize a common base checkpoint and so each impacted downstream operator can generally continue processing in-memory or in some cases load its last successful checkpoint.

Figure 7:
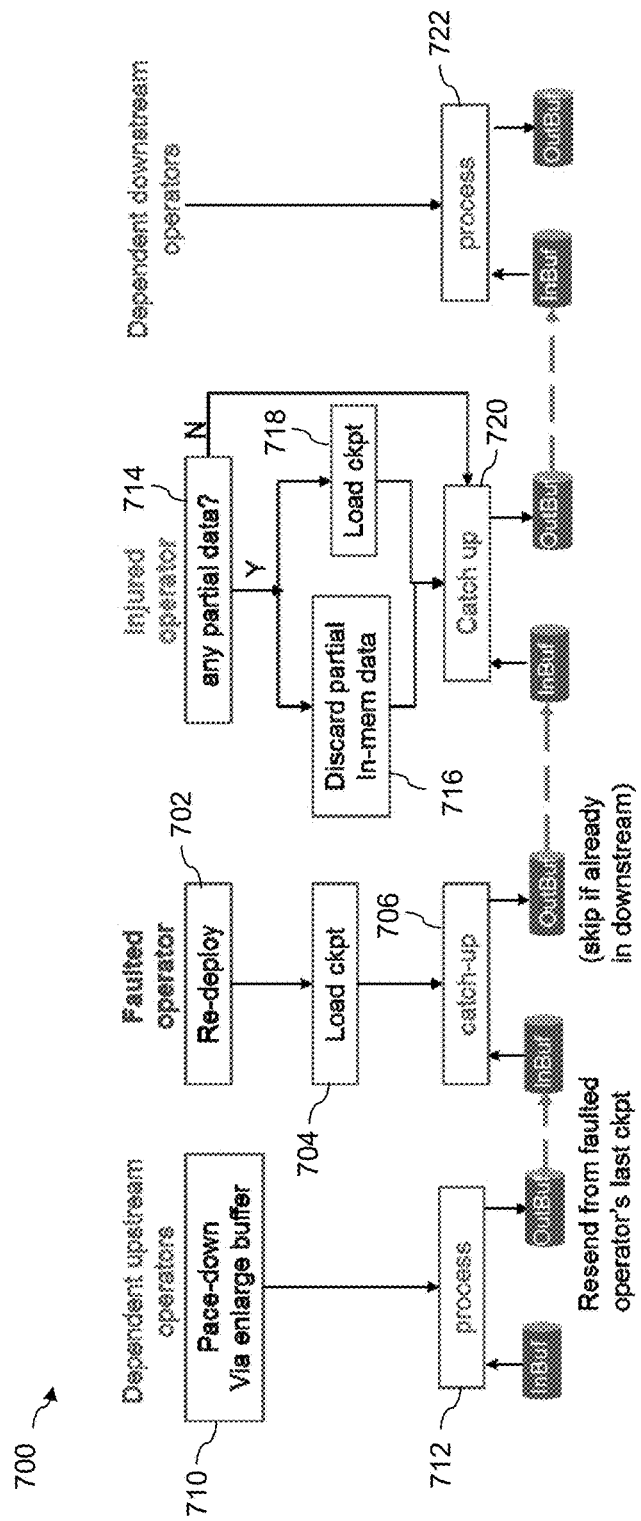
FIG. 7 is a more detailed flow diagram of a process for in-memory parallel recovery in an illustrative embodiment, showing recovery of a given faulted operator from a checkpoint and different sets of operations applied to an upstream operator, an immediately downstream operator and a further downstream operator.

FIG. 7 shows a more detailed view of an in-memory parallel recovery process 700 in an illustrative embodiment, showing recovery of a given faulted operator from a checkpoint and different sets of operations applied to upstream operators, immediately downstream operators and further downstream operators. The process 700 illustrates different sets of operations including steps 702, 704 and 706 for a given faulted operator, steps 712 and 712 for an upstream operator, steps 714, 716, 718 and 720 for an immediately downstream operator, and step 722 for a further downstream operator.

It is to be appreciated in this context that a given set of operations may include only a single operation. The term "set of operations" herein should therefore be construed as encompassing a set of one or more operations.

The faulted operator is re-deployed in step 702, possibly using replacement resources as indicated previously. The replacement resources can be allocated by a resource manager such as YARN, Kubernetes or Mesos. The last successful checkpoint of the faulted operator is loaded from the distributed storage system 108 in step 704, and then the operator performs catch-up processing in step 706.

The upstream operator is subject to pace-down action in step 710 by enlarging the size of its buffer. Alternative pace-down actions that may be performed include adjusting a data transfer frequency of the buffer. These and other pace-down actions are used to reduce pressure on the downstream operators during the recovery process. The upstream operator in step 712 continues to process data through its buffer as indicated. This includes resending data from the last successful checkpoint of the faulted operator. The upstream operator is therefore configured to resend to the faulted operator any data previously sent since a last successful checkpoint of the faulted operator.

The immediately downstream operator ("injured operator") determines in step 714 if there is any partial data in its corresponding buffer. This illustratively involves comparing a received window and a current window of the immediately downstream operator to a checkpoint window of the faulted operator. Such a comparison makes use of the window metadata recvWindow, curWindow and ckptWindow as previously described.

If there is no overlap between the received and current windows of the immediately downstream operator and the checkpoint window of the faulted operator, it is determined in step 714 that there is no partial data in the buffer of the immediately downstream operator, and the immediately downstream operator continues to process the data stream in-memory in step 720 without recovery from a checkpoint captured by its corresponding component of the distributed checkpoint manager 110.

If there is overlap between the received and current windows of the immediately downstream operator and the checkpoint window of the faulted operator, it is determined in step 714 that there is partial data in the buffer of the immediately downstream operator, and the partial data is discarded in step 716. The last successful checkpoint of the immediately downstream operator is then loaded in step 718. The immediately downstream operator performs catch-up processing in step 720 in recovering from that checkpoint. The set of operations applied to the immediately downstream operator in process 700 therefore in the worst case involves a possible 1-step back-off to its last successful checkpoint but more typically will involve continuing in-memory operation.

In the FIG. 7 process, the faulted operator is often the only operator that needs to recover from a checkpoint, and that checkpoint is its own last successful checkpoint. Accordingly, the inefficiencies associated with use of a common base checkpoint are avoided.

Figure 8:
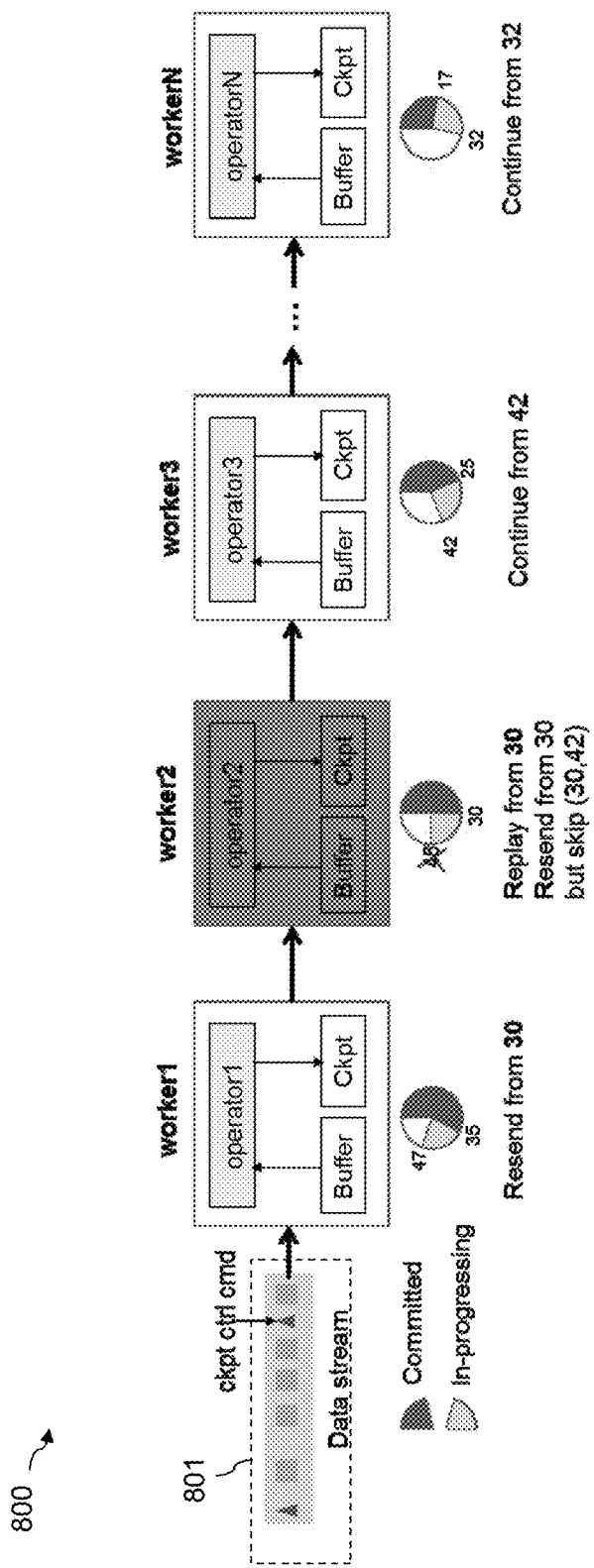
FIG. 8 shows an example of in-memory parallel recovery in an illustrative embodiment.

FIG. 8 revisits the previously-described example of FIG. 2 but in this case with use of an in-memory parallel recovery process of the type disclosed herein, and illustrates the significant advantages of that process relative to roll-back of the faulted operator and all downstream operators to a common base checkpoint.

More particularly, in this embodiment, a set of processing nodes 800 are configured to process data stream 801 using the in-memory parallel recovery process. The processing nodes 800 comprise worker nodes having respective operators, buffers and distributed checkpoint manager components as previously described.

In accordance with the in-memory parallel recovery process as illustrated in FIG. 8, upstream operator1 resends data from time 30 instead of time 17 as in the FIG. 2 example, and faulted operator2 recovers by replaying from a checkpoint at time 30 instead of time 17 while resending data from time 30 to immediately downstream operator3 but skipping data already available in that downstream operator, in this case data in the range from time 30 to time 42. Moreover, the immediately downstream operator3 is able to continue its in-memory processing from time 42 instead of replaying from a checkpoint at time 17. Similarly, further downstream operator4 is able to continue its in-memory processing from time 42 instead of replaying from a checkpoint at time 17.

Such an arrangement represents a significant improvement in recovery efficiency relative to the FIG. 2 arrangement.

It is to be appreciated that these and other features of illustrative embodiments are presented by way of example only, and should not be construed as limiting in any way.

Accordingly, different numbers, types and arrangements of system components such as processing nodes, operators, buffers and distributed checkpoint managers can be used in other embodiments.

It should also be understood that the processes of FIGS. 6 and 7 and other in-memory parallel recovery features and functionality described above can be adapted for use with other types of information systems, including by way of example an information processing system in which one or more compute nodes and a corresponding storage system are all implemented on the same processing platform.

The particular processing operations and other system functionality described in conjunction with the flow diagrams of FIGS. 6 and 7 are therefore presented by way of illustrative example only, and should not be construed as limiting the scope of the disclosure in any way. Alternative embodiments can use other types of processing operations involving in-memory parallel recovery in a distributed processing system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different types of in-memory parallel recovery for respective different sets of operators of a given information processing system.

Functionality such as that described in conjunction with the flow diagrams of FIGS. 6 and 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, an implementation of distributed checkpoint manager 110 that is configured to control performance of one or more steps of the processes in FIGS. 6 and 7 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. Respective components of the distributed checkpoint manager 110 can be implemented in respective LXCs running on respective ones of the processing nodes 106.

Illustrative embodiments of distributed processing systems with in-memory parallel recovery functionality as disclosed herein can provide a number of significant advantages relative to conventional arrangements.

For example, some embodiments classify different operators based on their different upstream or downstream relationships to a given faulted operator and apply different sets of operations in parallel to operators in different classes. Such arrangements advantageously avoid the need to utilize a common base checkpoint from one operator that potentially lags far behind more recent checkpoints of other operators.

In some embodiments, only the faulted operator recovers from a checkpoint while downstream operators can typically continue in-memory operations. Each operator is therefore much more likely to be able to recover from its own last successful checkpoint independently of the other operators.

These embodiments fully exploit existing in-memory data while also reducing the number of replays from checkpoints and as a result the associated input-output operations, processor cycles, network traffic and resource contention.

Accordingly, the overall recovery process is made much more efficient and far less time consuming than would otherwise be possible. Adverse impact on normal processing and other concurrent workloads is also significantly reduced.

Some embodiments implement in-memory parallel recovery utilizing lightweight window metadata that further improves the efficiency and scalability of the in-memory parallel recovery process.

Illustrative embodiments can provide recovery performance optimization in a wide variety of different types of distributed processing systems. Such optimization is particularly important in critical distributed processing in applications that require a high level of fault tolerance, including by way of example medical, financial and IoT applications.

These and other embodiments can advantageously provide significantly improved recovery performance in a distributed processing system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as distributed processing system 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of a distributed processing system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
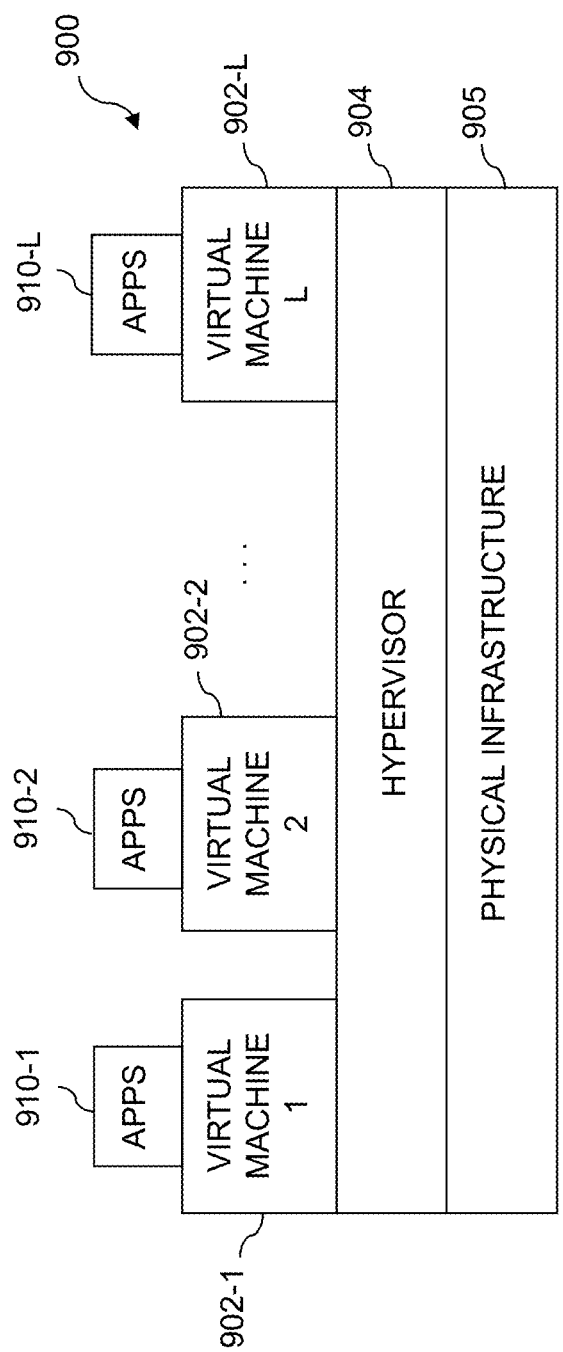
FIGS. 9 and 10 show examples of processing platforms that may be utilized to implement at least a portion of an information processing system in illustrative embodiments.
Figure 10:
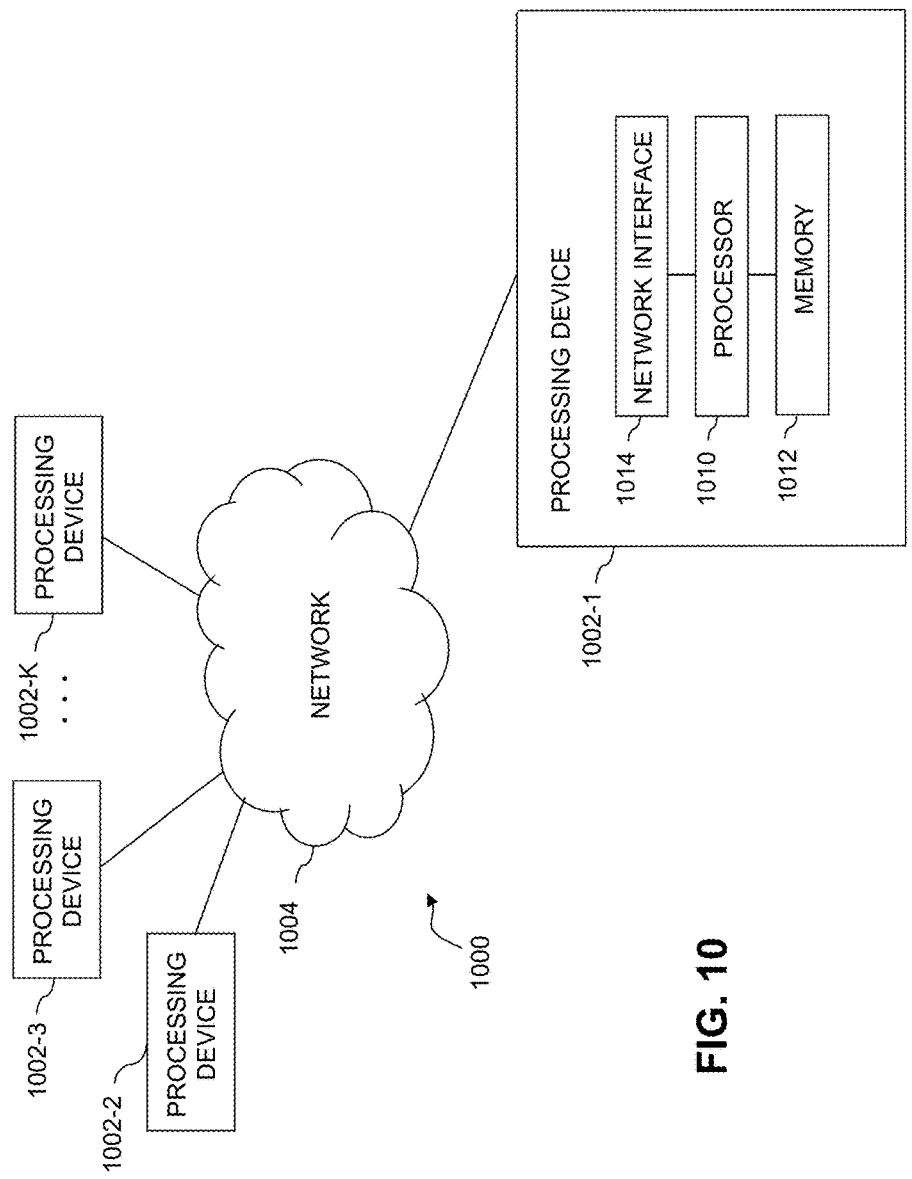

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the distributed processing system 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, distributed processing systems, processing nodes, storage systems, checkpoint managers, operators, buffers and in-memory parallel recovery processes. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a distributed processing system comprising a plurality of processing nodes;
each of the processing nodes comprising a processor coupled to a memory and being configured to communicate over one or more networks with other ones of the processing nodes;
the processing nodes comprising respective buffers and respective components of a distributed checkpoint manager of the distributed processing system;
the processing nodes implementing respective ones of a plurality of operators for a processing a data stream in the distributed processing system;
each of the operators being configured to interact with its corresponding one of the buffers and its corresponding one of the components of the distributed checkpoint manager on the corresponding one of the processing nodes;
responsive to a detected fault in a given one of the operators processing the data stream, partitioning other ones of the operators processing the data stream into one or more upstream operators, one or more immediately downstream operators, and one or more further downstream operators, relative to the given faulted operator;

recovering the given faulted operator from a checkpoint captured by its corresponding component of the distributed checkpoint manager; and in parallel with recovering the given faulted operator, performing different sets of operations for respective ones of the upstream operators, immediately downstream operators and further downstream operators.

2. The apparatus of claim 1 wherein the distributed checkpoint manager is configured via its components of the respective processing nodes to capture checkpoints of the operators of those processing nodes.

3. The apparatus of claim 1 wherein the data stream comprises one or more checkpoint control commands that are processed by the components of the distributed checkpoint manager of the respective processing nodes.

4. The apparatus of claim 1 wherein the buffers of the respective processing nodes comprise respective in-memory buffers each having both an input buffer and an output buffer within the memory of that processing node.

5. The apparatus of claim 1 wherein the different sets of operations performed for respective ones of the upstream operators, immediately downstream operators and further downstream operators comprise:

for each upstream operator, performing at least one pace-down action without recovery from a checkpoint captured by its corresponding component of the distributed checkpoint manager;

for each immediately downstream operator, determining if there is any partial data in its corresponding buffer and if there is no partial data in the buffer then continuing to process the data stream in-memory without recovery from a checkpoint captured by its corresponding component of the distributed checkpoint manager and if there is partial data in the buffer then discarding the partial data and recovering from the checkpoint captured by its corresponding component of the distributed checkpoint manager; and for each further downstream operator, continuing to process the data stream in-memory without recovery from a checkpoint captured by its corresponding component of the distributed checkpoint manager.

6. The apparatus of claim 5 wherein performing at least one pace-down action for a given one of the upstream operators comprises increasing a size of its corresponding buffer.

7. The apparatus of claim 1 wherein the distributed checkpoint manager is configured via its components of the respective processing nodes to maintain window metadata for respective ones of the buffers of those processing nodes.

8. The apparatus of claim 7 wherein the window metadata maintained for a given one of the buffers of a corresponding one of the processing nodes comprises:

a receive window indicating new data most recently received in the buffer;

a current window indicating data currently being processed by the operator of the corresponding processing node; and a checkpoint window indicating a last successful data checkpoint for that operator;

wherein each of the receive window, the current window and the checkpoint window has a corresponding unique identifier; and wherein the unique identifiers of the receive window, the current window and the checkpoint window increase over time as the data stream is processed by the operator.

9. The apparatus of claim 7 wherein the window metadata maintained for a given one of the buffers of a corresponding one of the processing nodes is maintained for an in-memory input buffer of the given buffer.

10. The apparatus of claim 1 wherein the upstream operator is configured to resend to the given faulted operator any data previously sent by the upstream operator to the given faulted operator since a last successful checkpoint of the given faulted operator.

11. The apparatus of claim 5 wherein determining for a given immediately downstream operator if there is any partial data in its corresponding buffer comprises comparing a received window and a current window of the immediately downstream operator to a checkpoint window of the given faulted operator.

12. The apparatus of claim 11 wherein if there is no overlap between the received and current windows of the given immediately downstream operator and the checkpoint window of the given faulted operator, it is determined that there is no partial data in the buffer of the given immediately downstream operator, and the given immediately downstream operator continues to process the data stream in-memory without recovery from a checkpoint captured by its corresponding component of the distributed checkpoint manager.

13. The apparatus of claim 11 wherein if there is overlap between the received and current windows of the given immediately downstream operator and the checkpoint window of the given faulted operator, it is determined that there is partial data in the buffer of the given immediately downstream operator, and the partial data is discarded and the given immediately downstream operator is recovered from the checkpoint captured by its corresponding component of the distributed checkpoint manager.

14. The apparatus of claim 1 wherein the distributed checkpoint manager stores checkpoints for respective ones of the operators in a distributed storage system of the distributed processing system.

15. A method comprising:

implementing in a plurality of processing nodes of a distributed processing system respective ones of a plurality of operators for a processing a data stream in the distributed processing system;

responsive to a detected fault in a given one of the operators processing the data stream, partitioning other ones of the operators processing the data stream into one or more upstream operators, one or more immediately downstream operators, and one or more further downstream operators, relative to the given faulted operator;

recovering the given faulted operator from a checkpoint of that operator; and in parallel with recovering the given faulted operator, performing different sets of operations for respective ones of the upstream operators, immediately downstream operators and further downstream operators;

wherein each of the processing nodes comprises a processor coupled to a memory and is configured to communicate over one or more networks with other ones of the processing nodes.

16. The method of claim 15 wherein the different sets of operations performed for respective ones of the upstream operators, immediately downstream operators and further downstream operators comprise:

for each upstream operator, performing at least one pace-down action without recovery from a checkpoint of that operator;

for each immediately downstream operator, determining if there is any partial data in its corresponding buffer and if there is no partial data in the buffer then continuing to process the data stream in-memory without recovery from a checkpoint of that operator and if there is partial data in the buffer then discarding the partial data and recovering from the checkpoint of that operator; and for each further downstream operator, continuing to process the data stream in-memory without recovery from a checkpoint of that operator.

17. The method of claim 15 further comprising maintaining window metadata for respective buffers of the processing nodes, wherein the window metadata maintained for a given one of the buffers of a corresponding one of the processing nodes comprises:

a receive window indicating new data most recently received in the buffer;

a current window indicating data currently being processed by the operator of the corresponding processing node; and a checkpoint window indicating a last successful data checkpoint for that operator;

wherein each of the receive window, the current window and the checkpoint window has a corresponding unique identifier; and wherein the unique identifiers of the receive window, the current window and the checkpoint window increase over time as the data stream is processed by the operator.

18. A computer program product comprising a non-transitory processor-readable storage medium having stored therein program code of one or more software programs, wherein the program code when executed by a data processing system including a plurality of processing nodes, each of the processing nodes comprising a processor coupled to a memory and being configured to communicate over one or more networks with other ones of the processing nodes, causes the data processing system:

to implement in the processing nodes respective ones of a plurality of operators for a processing a data stream in the distributed processing system;

responsive to a detected fault in a given one of the operators processing the data stream, to partition other ones of the operators processing the data stream into one or more upstream operators, one or more immediately downstream operators, and one or more further downstream operators, relative to the given faulted operator;

to recover the given faulted operator from a checkpoint of that operator; and in parallel with recovering the given faulted operator, to perform different sets of operations for respective ones of the upstream operators, immediately downstream operators and further downstream operators.

19. The computer program product of claim 18 wherein the different sets of operations performed for respective ones of the upstream operators, immediately downstream operators and further downstream operators comprise:

for each upstream operator, performing at least one pace-down action without recovery from a checkpoint of that operator;

for each immediately downstream operator, determining if there is any partial data in its corresponding buffer and if there is no partial data in the buffer then continuing to process the data stream in-memory without recovery from a checkpoint of that operator and if there is partial data in the buffer then discarding the partial data and recovering from the checkpoint of that operator; and for each further downstream operator, continuing to process the data stream in-memory without recovery from a checkpoint of that operator.

20. The computer program product of claim 18 wherein window metadata is maintained for respective buffers of the processing nodes, and wherein the window metadata maintained for a given one of the buffers of a corresponding one of the processing nodes comprises:

a receive window indicating new data most recently received in the buffer;

a current window indicating data currently being processed by the operator of the corresponding processing node; and a checkpoint window indicating a last successful data checkpoint for that operator;

wherein each of the receive window, the current window and the checkpoint window has a corresponding unique identifier; and wherein the unique identifiers of the receive window, the current window and the checkpoint window increase over time as the data stream is processed by the operator.

21. The apparatus of claim 1 wherein a first one of the different sets of operations for a given upstream operator comprises performing at least one pace-down action without recovery from a checkpoint and a second one of the different sets of operations for a given immediately downstream operator comprises conditionally performing a recovery from a checkpoint based at least in part on whether or not partial data is present in a corresponding buffer of that operator.

* * * * *